May 3, 1960 A. P. GRUNWALD 2,935,326

RADIAL PHONOGRAPH PICK-UP ARM

Filed Feb. 20, 1956 4 Sheets-Sheet 1

Inventor
Arnold P. Grunwald
Attorney

RADIAL PHONOGRAPH PICK-UP ARM

Filed Feb. 20, 1956 4 Sheets-Sheet 2

Inventor
Arnold P. Grunwald
Jack Dominik
Attorney

May 3, 1960 A. P. GRUNWALD 2,935,326

RADIAL PHONOGRAPH PICK-UP ARM

Filed Feb. 20, 1956 4 Sheets-Sheet 3

Inventor
Arnold P. Grunwald
[signature]
Attorney

Inventor
Arnold P. Grunwald
Attorney 2,935,326

RADIAL PHONOGRAPH PICK-UP ARM

Arnold P. Grunwald, Chicago, Ill., assignor to Capital Engineering & Manufacturing Corporation Application February 20, 1956, Serial No. 566,474

5 Claims. (Cl. 274—23)

This application forms a continuation-in-part of the application Serial No. 511,895, now abandoned.

The present invention relates to phonograph pick-up arms, and more specifically to a radial pick-up arm. Although the pick-up arm may be employed on most phonograph sets, it has particularly useful application in such units where a high fidelity of reproduction is desirable.

Conventional pick-up arms usually operate tangentially to a circular phonograph record. Such pick-up arms are pivoted at one end for vertical and horizontal travel, and have the pick-up needle mounted in the other end. The resulting action is to vary the surfaces of the needle in contact with the groove as well as to constantly shift the effective center of needle drag as the record is progressively played. The locus of the needle on a tangential pick-up arm is actually a narrow segment of a spherical surface. The result of this action is a continuing variation in the fidelity of reproduction, as well as to induce permanent distortion from uneven needle wear. Tracking errors result as well.

In theory there is little doubt as to the desirability of employing a radial pick-up arm, or an equivalent pick-up mechanism through which the pick-up needle is advanced inwardly on the record on a radial of the record. The locus of the needle in a radial pick-up construction is a small longitudinal section of a cylindrical surface. Some such devices have been proposed, but their inherent impracticality is testified to by their lack of commercial success. In some instances the structure is such that an undue amount of sliding friction is induced through the normal collection of dust and dirt. Others are complex and expensive. In addition, in almost all instances the proposed radial pick-up arms are inoperable with conventional record changers.

With the foregoing in mind, it is the general object of the present invention to provide a radial phonograph pick-up arm with an inherent high fidelity of reproduction and yet simple and inexpensive in manufacture and operation. A related object is to furnish a radial pick-up arm which is actually easier for the operator to position manually than the conventional tangential arms.

Another object of the invention is to provide a radial phonograph pick-up arm which can be inexpensively and expeditiously retracted for use with automatic record changers.

A further object of the invention looks to providing a unique cantilever construction for a single arm radial phonograph pick-up employing a combination of rolling and sliding friction at its bearing support to implement the operation of the pick-up head. A related object is to furnish a single arm pick-up with a center of mass as close as practicable to the pick-up radial thereby amplifying the pick-up response to the record groove intelligence.

Still another object of the invention is to provide a radial phonograph pick-up arm construction which reduces lost motion to an irreducible minimum.

Further objects and advantages of the present invention will become apparent as the following specification proceeds, taken in conjunction with the illustrative drawings in which.

Figures 1, 2, 3:
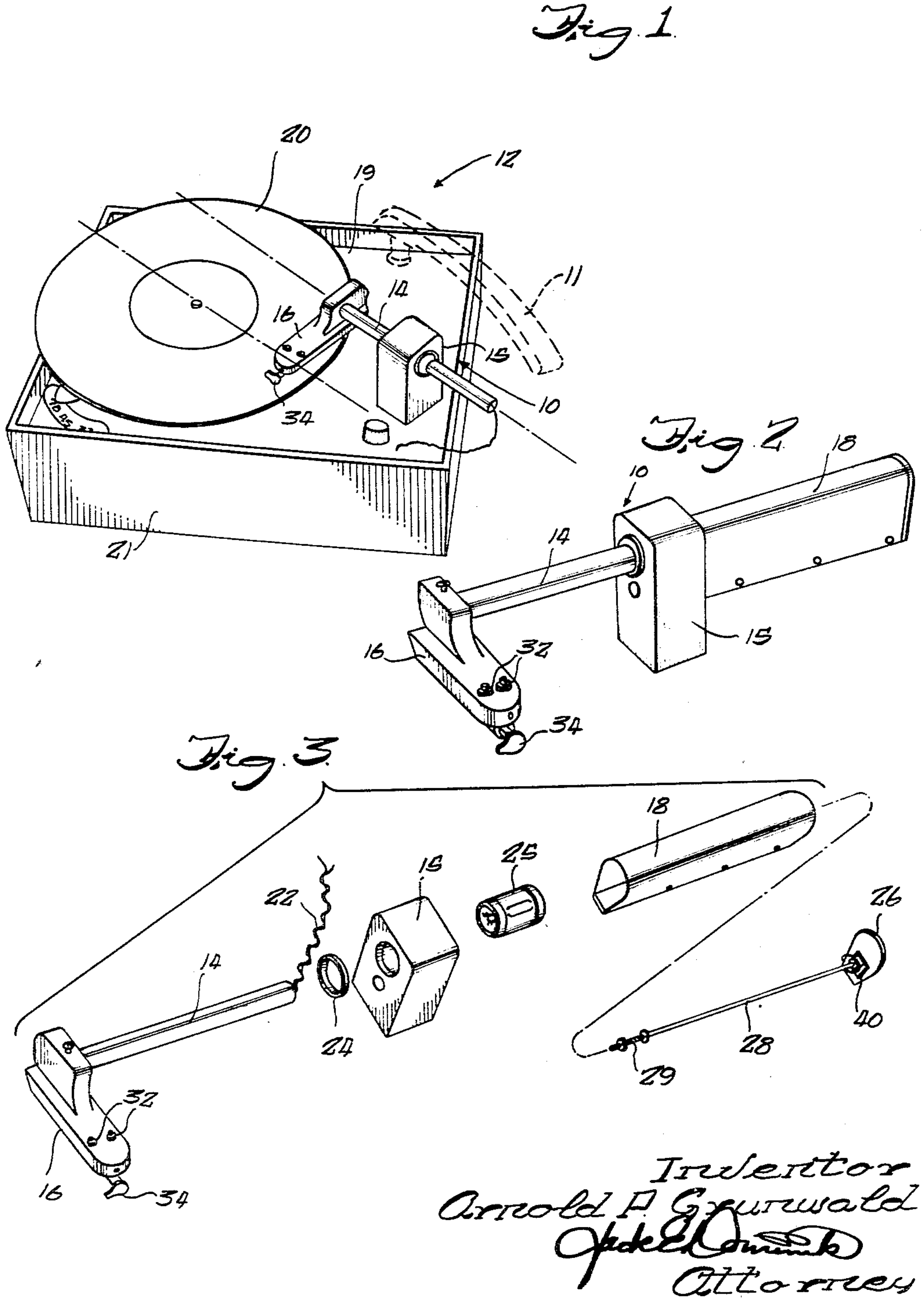
Figure 1 is a perspective view of a typical phonograph record player employing a radial phonograph pick-up arm illustrative of the present invention operating in the conventional trailing relationship with the record.
Fig. 2 is a perspective view of a phoongraph pick-up arm illustrated in Fig. 1.
Fig. 3 is an exploded perspective view of the phonograph pick-up arm shown in Fig. 2.

The use of an illustrative radial phonograph pick-up arm 10 is portrayed in Fig. 1. By way of contrast a typical tangential type pick-up arm 11 is shown in phantom outline on the record player unit 12. The record player unit contemplates a turntable 19 beneath a record 20 which is rotated at various speeds depending upon the type of record to be played. The motor, amplifier, speaker, and other components of the record player are housed in the phonograph body 21. It will be appreciated, of course, that a wide variety of phonographs and record player constructions are contemplated for use with the radial phonograph pick-up arm, and that the essentials of the pick-up arm constitute the important features of the invention.

In broad outline, the unique radial pick-up arm 10 illustrated contemplates a longitudinally sliding cantilever support arm 14 journaled in a support 15 which terminates in a pick-up head 16. A shield 18 is provided to cover the rear portion of the arm 14 and its associated wiring, thereby electrically shielding the pick-up wires from the remainder of the unit. The shield also functions to seal the bearing mechanism of the support 15 from dirt and dust thereby serving to reduce frictional losses which might be encountered in operation. In Fig. 1 the shield 18 has been shown removed.

The relationship of the components of the exemplary pick-up arm 10 is illustrated in the exploded view shown in Fig. 3. There it will be seen that the supporting arm 14 is a hollow tubular member inside of which the pick-up wiring 22 is located. The arm 14 is journaled in a recirculating frictionless ball-bearing 25 which is securely mounted within the support 15 and retained there by a rubber ring 24. The shield 18 is secured to the support 15 by means of an end cap 26 to which an elongated threaded tie rod 28 is secured. The tie rod 28, in turn, is secured at its threaded end 29 to the support 15.

Figures 9, 10:
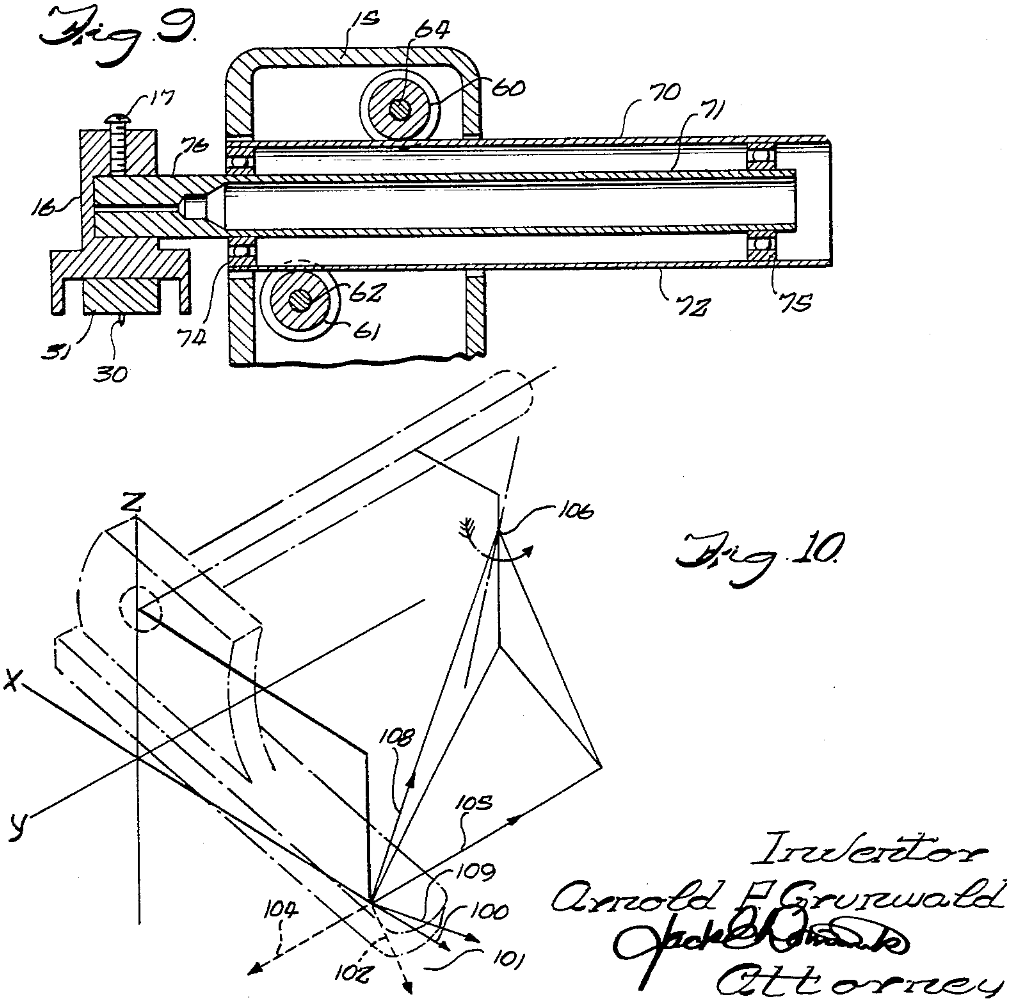
Fig. 9 is an enlarged partial section of an illustrative form of a radial phonograph pick-up arm showing an alternative means for journaling the arm.
Fig. 10 is a diagrammatic view of a force analysis at the needle of a phonograph pick-up arm illustrative of the present invention, shown in Figs. 1–3.
Figures 11, 15:
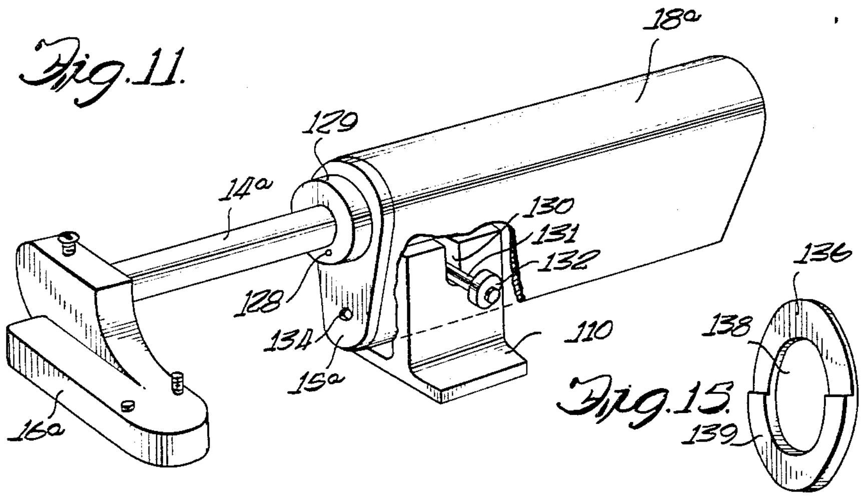
Fig. 11 is a perspective, partially broken, view of a tone arm illustrating a modification of the subject invention.
Fig. 15 is a perspective view of a dust wiper employed along the tone arm.

Before outlining the details of construction of the exemplary radial pick-up arm, it will prove helpful to understand the forces which impinge upon the pick-up needle as shown diagrammatically in the force diagram in Fig. 10. As will be seen in Fig. 10, the frictional force of the needle against the groove 100 and the force component of the weight on the needle 101 resolve in a downward tangential force 102. The vibrations of the needle contacting a modulated groove are lateral and perpendicular to the tangent of the modulated groove. Thus lateral forces 104 and their reactions 105 are shown as perpendicular to the X-axis. The center of mass of the pick-up arm 106 is located behind the needle and close to the support. Therefore a component 108 on the line connecting the needle point with 106 and another component 109 perpendicular to the connecting line are substituted for the radial reaction 105. The component 109 of the reactive forces is actually forward, inward, and downward. Under most ideal conditions the center of mass would be along the extended line of radial travel of the pick-up needle. Obviously in the tangential type of pick-up arm 11 such as illustrated in Fig. 1, the center of mass is located far from this ideal location, whereas with the radial type pick-up arm such as described herein, this center of mass rapidly approaches the ideal location.

A further advantage occurs through the use of the unique cantilever supported radial arm. As the force analysis above illustrated, a moment is created at the pick-up head by the frictional forces 100 in play at the needle. This moment tends to move the needle from its track in the center of the groove, but is prevented from doing so by the bearing and support post. As the arm extends further toward the center of the record the distorting moment increases correspondingly. The very cantilever nature of the arm cancels out this effect, however, even within the limits of lost motion as the load on the bearing and support post increase correspondingly. Further support is added by the unique cradling action of the bearing construction which will be described later.

Even greater fidelity of reproduction with an attendant reduction of needle wear may be achieved by reversing the relative rotation of the needle and the record from the conventional. In this manner the needle, in effect, plows into the groove rather than being trailed in the groove. It has been found that a 3-gram static needle load will suffice when the needle leads into the groove rather than trails. In the trailing position the most effective static needle loading is between 8 and 14 grams. Naturally the additional weight induces additional wear on the needle and the groove.

This unexpected reduction in needle loading arises because of the dynamic loading of the needle caused by vibrations of greater amplitude in the needle groove. A further attendant advantage arises out of the fact that a lighter needle loading is desirable when the vibratory amplitude is less, for example, when reproducing piano music. With a needle loading of a minimum with an overriding dynamic loading for the high volume passages this desirable result may be achieved in the radial phonograph pick-up arm of the character described. Expressed mathematically it can be said that the required static needle loading ($S_T$) is the sum of the unmodulated effect of the groove to lift the needle when trailingly tracking ($T_T$) and the dynamic lift ($D_T$) impressed on the needle when it encounters a modulated portion of the groove. Thus:

$$S_T = T_T + D_T$$

But when in the plowing relationship the dynamic force is downward for the full cycle and consequently has a negative value. Thus:

$$S_P = T_P - D_P$$

As stated above, the plowing action of the needle permits reduced loading, increases needle life, and increases the fidelity of reproduction.

Figure 4:
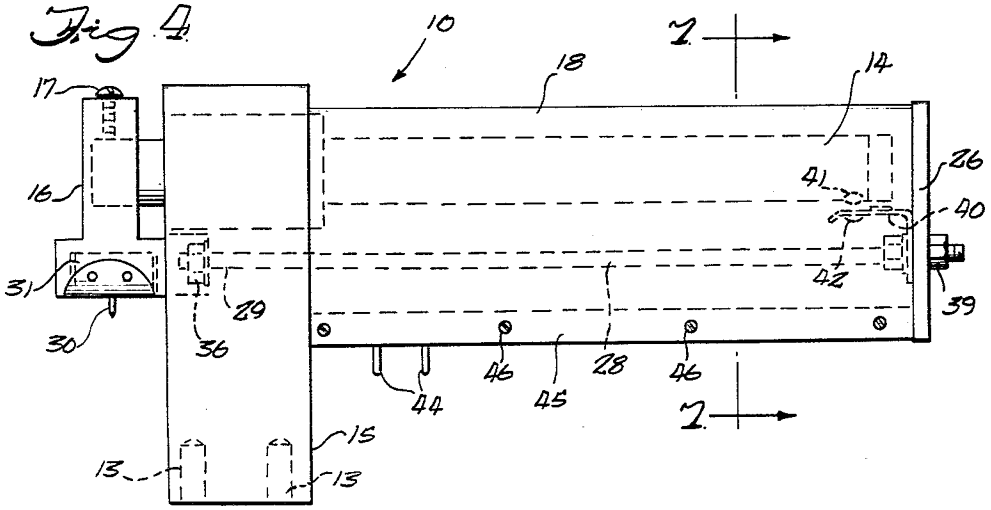
Fig. 4 is a front elevation of the phonograph pick-up arm, reversed from the trailing relationship in Figs. 2 and 3.
Figures 5, 6, 7:
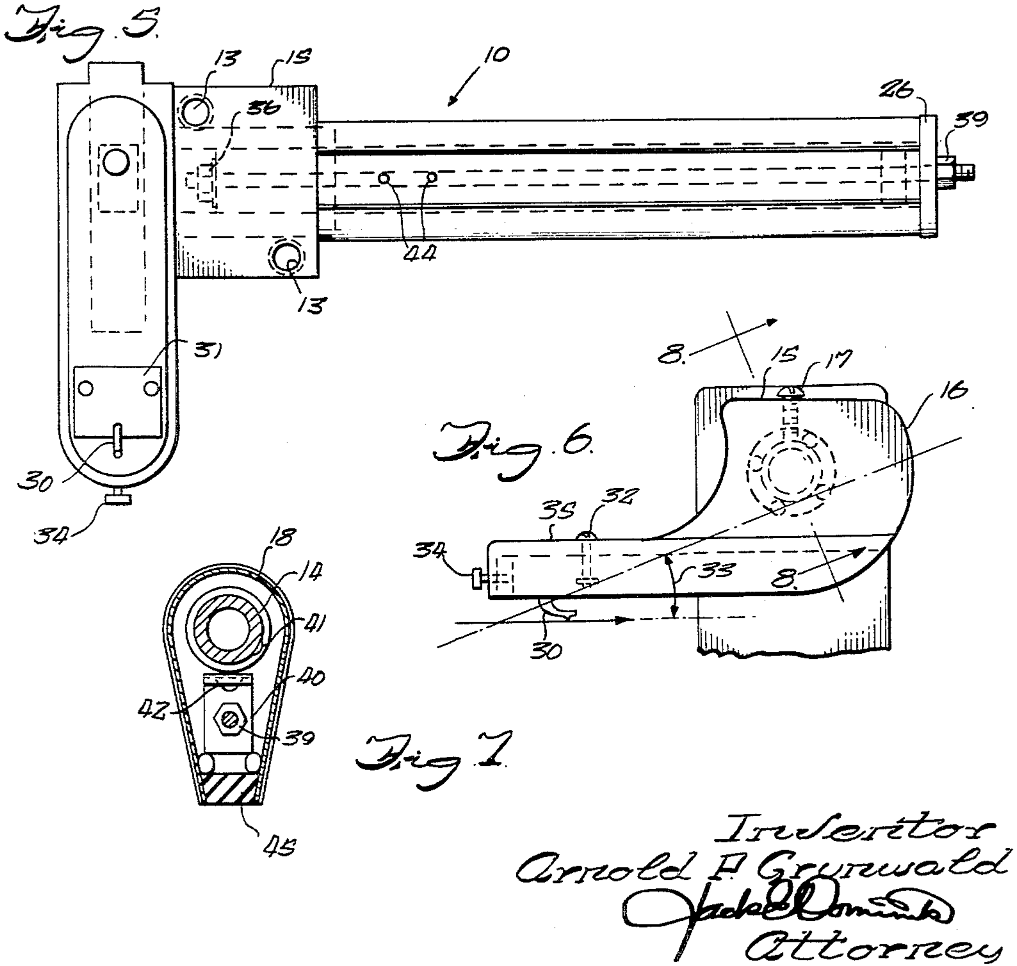
Fig. 5 is a bottom view of the phonograph pick-up arm shown in Fig. 4.
Fig. 6 is an end view of the pick-up arm shown in Fig. 4.
Fig. 7 is a sectional view of the pick-up arm taken along section line 7—7 of Fig. 4.

The details of the components of the radial phonograph pick-up arm 10 and their assembled relation are depicted in Figs. 4–8. Referring now to Fig. 4, it will be seen that the pick-up arm 14 has the pick-up head 16 secured to its end portion by means of a set screw 17. The phonograph needle 30 is mounted within a cartridge 31 which is removably secured to the pick-up head 16 by means of bolts 32 or other convenient fastening elements. A manual switch 34 is provided in conjunction with the needle in order to switch needles where various speed records are to be played. The needle and cartridge 31 are mounted in a forward extension 35 of the pick-up arm 16 as best illustrated in Fig. 6.

Since the arm 14 is journaled to extend radially toward the center of the record being played, it necessarily must retreat rearwardly from the support 15. A housing 18 has been provided at the rear portion of the pick-up arm 10 and is secured to the support post 15 by means of an elongated tie rod 28. The threaded portion 29 of the tie rod 28 is engaged by a nut 36. The other end of the tie rod is secured by an end cap 26 with which nuts 39 are in compressed relation. A cantilever type spring detent 40 is also secured by means of the tie rod nuts 39 which coact with the end cap 26.

To hold the pick-up head in its out-of-play position when retracted a projection 41 is located on the rear end portion of the arm 14 to engage the recessed portion 42 of the detent 40. The detent is engaged by retracting the pick-up head 16 and turning it upwardly. The pick-up wires 22 are suitably looped within the housing 18 and secured at their ends to the outlet prongs 44 to which any suitable block may be secured. A dielectric material base 45 is provided for the housing and secured in place by means of fasteners 46.

Figure 8:
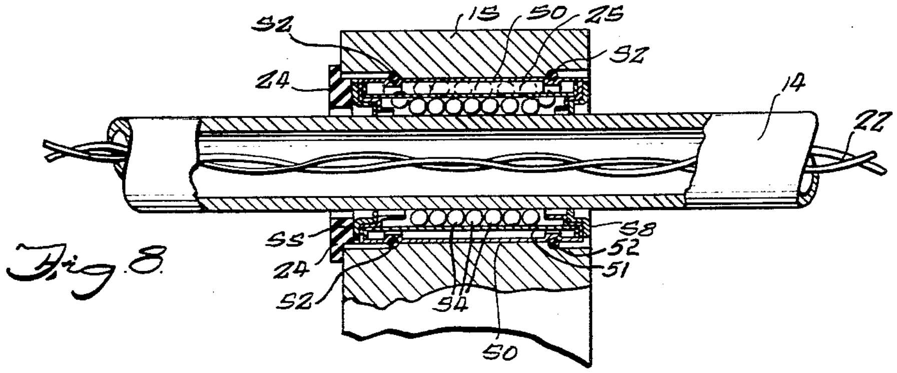
Fig. 8 is an enlarged partial section of the phonograph pick-up arm support section taken along section 8—8 of Fig. 6.

Through the employment of a recirculating type ball bearing 25 such as illustrated in an enlarged cross-sectional view in Fig. 8, the frictional forces within the unit are greatly reduced. The bearing 25 contemplates an outer shell 50 and inner shell 51. Snap rings 52 secure the bearing in place within the housing 15. A plurality of racetrack shaped courses are provided for the roller balls 54, one longitudinal edge of which is opened so that the balls may tangentially contact the outer surface of the arm 14. In this manner the arm 14 may be adjusted longitudinally on rolling friction. If the arm 14 is to be rotated, that rolling friction attributable to lateral clearance in the retainer will also be encountered, and then subsequently the rotation will be accomplished against point sliding friction. This reduces the impact of the needle on the record when the needle is set down for playing. On the other hand, wobble of the record will move the head only within the limits of rolling friction. Retaining caps 55 and 58 secure the opposite ends of the bearing. A rubber bumper 24 may be provided to cushion the head at its inner position. The support 15 is mounted to the phonograph by means of fasteners secured in the threaded base holes 13.

The construction of the recirculating bearing is such as to provide four equally spaced longitudinal races of balls parallel with the central axis of the arm 14. The most effective orientation of the bearing 25 is such that the angle of intersection 33 (shown in Fig. 6) of the cradling races and the plane of contact of the needle 30 is between 25° and 35°. The maximum distortion appears to occur when this orientation angle is 45°. The direction of the acute orientation angle is to point toward the direction from which the groove is engaging the needle. Hence the orientation shown in Fig. 8 is applicable when the needle is being plowed in the groove, but would be reversed when the needle is trailing in the groove.

An alternative form of the journal mounting of the arm 14 is shown in Fig. 9. There it will be seen that a staggered pair of rollers 60, 61 with concave peripheral grooves journaled on support shafts 62, 64 hold the arm 14 for longitudinal rolling adjustment. The forward end of the arm 14 is fixed to the pick-up head by means of the set screw 17 as in the embodiment discussed above. The pick-up head 16 construction otherwise is similar to that of the preferred embodiment already described in detail above.

The construction of the extendible arm 70 of the modified embodiment differs from that of the extendible arm 14 described above mainly in its internal construction. As will be seen there is an internal shaft 71 mounted coaxially within an external shaft 72, the internal shaft being journaled by front and rear ball bearings 74, 75. The front head 76 of the internal shaft 71 has the same configuration as the forward end of the shaft 14. With this construction the rotary motion of the head 16 is against rolling friction as well as the longitudinal motion. In operation the extendible arm 70 is still cantilever supported by the support 15 through the rollers 60, 61.

In the alternative embodiment as illustrated in Fig. 9, the unit is so balanced that the rear roller 60 is always subjected to an upward force from the arm 70 and the forward roller 61, of course, always subjected to a downward force. Although a ball bearing 63 has been shown in the alternative embodiment, it is contemplated that in some applications a dampening action on the rotating friction will be required either by means of tightening a bearing lock nut, or employing a sliding friction support for the pick-up head 16.

A second alternative embodiment of the bearing and pick-up arm support is shown in Figs. 11 to 15. Also, it will be seen in Fig. 11 that the body housing has been modified slightly from the preceding embodiments shown and described in detail. The modified body contemplates an interior support block 15*a* which is secured to a T-shaped base 110. The outer housing or shield 16*a* covers the unit and shields it from the collection of dust and dirt, as well as from electrical stray fields. A single extendible cantilever support arm 14*a* moves outwardly from the housing and has at a pick-up head 16*a* its end portion of substantially the same nature as that described in detail before.

A unique sleeve-type bearing assembly 120 is mounted within the support block 15*a*, as will be described in greater detail. The sleeve-type bearing which is shown permits cost savings of a substantial order and yet operates very satisfactorily. The bearing assembly itself contemplates an outer sleeve 121 secured rigidly within the support block 15*a*. The sleeve terminates at its forward portion at the front edge of the support block 15*a*. Within the outer sleeve is a second sliding sleeve 122 of an interior diameter slightly greater than the exterior diameter of the cantilever support arm 14*a*. A plurality of holes located in two planes at 90° centers are provided in the inner sleeve 122 to receive steel balls 124. It has also been found that the balls will perform satisfactorily when pairs are separated by 60° at opposed points on the shaft. Although the unit will function with a wide variety of ball combinations, the preferred form is that illustrated.

Figure 12:
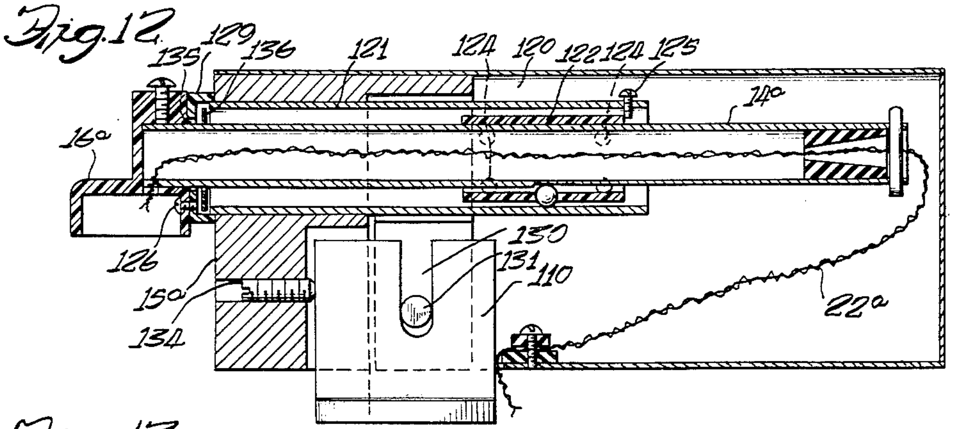
Fig. 12 is a longitudinal sectional view of the tone arm shown in Fig. 11.

In operation, the arm will start in its fully retracted position as shown in Fig. 12. In this position the bearing sleeve 122 is oriented at the rear portion of the permanent sleeve 121 and secured against dislodgement by means of stop screw 125 or any similar blocking member.

As the cantilever support arm 14*a* moves outwardly in the course of playing the record, the sleeve 122 and its associated balls 124 will travel outwardly within the permanent sleeve 121, while rollingly advancing the support arm 14*a*. The dynamic relationship between the bearing sleeve 122, cantilever support arm 14*a*, and outer sleeve 121, is such that the mechanical advantage in the system is 2:1. Thus, the bearing sleeve 122 will roll outwardly half the distance of the travel of the cantilever support arm 14*a*. In this manner the support arm weight can be balanced on the bearing sleeve 122 to a greater extent than when other types of bearings are employed as the effective support point of the arm advances inwardly. Also the radial friction on drag is proportionately reduced by the 2:1 mechanical advantage.

After the pick-up arm is returned to its position of rest, a support pin 126 within the pick-up head 16*a* is positioned in the hole 128 in the bearing cap 129 to hold the pick-up head off of the record.

Because radial drag or friction induced as the pick-up head travels outwardly may produce distortion, provision has been made for an equalization of this effect by a tilting adjustment for the bearing assembly as shown in Fig. 12. There it will be seen that the base 110 has a central slot 130 into which a support pin 131 may be inserted. A nut 132, threaded to the end of the support pin 131 secures the support block 15*a* to the base support 110. The base support 110 is in turn secured to the table of the associated phonograph.

In addition, a fine set screw 134 in the forward portion of the support block 15*a* impinges on the vertical web of the base support 110. By threading the set screw 134 in and out of the support 15*a*, the travel of the cantilever support arm 14*a* may be adjusted to extend slightly downwardly. When this downward angle is sufficient to overcome the rolling friction of the bearing assembly, the lateral drag or radial friction of the unit is adjusted to an irreducible minimum. Because the head of the conventional stylus in a pick-up cartridge is rounded at its end point, the distortion induced in the transmission from the undulations on the record groove to the cartridge permits a tolerance of at least 2° to 3° in the vertical alignment of the stylus. As a consequence, the unit may be tilted slightly to eliminate radial drag without inducing the harmful side effects which might be caused by improper stylus alignment.

One of the contributory factors to radial drag or friction is dirt or dust which may be lodged particularly on the top surface of the cantilever support arm 14*a* and subsequently work its way into the bearing. To prevent such an accumulation of dust a direct, simple, effective and unique wiper is placed at the outer end of the outer sleeve 121. The wiper assembly contemplates a bearing cap 129, shown in Figs. 11 and 12, which in the present instance is in the form of a washer having a depending peripheral flange which matingly receives the extended end portion of the permanent sleeve 121 and abuts the support block 15*a*. Sufficient clearance is provided in the central opening 135 of the bearing cap 129 so that there is no frictional contact between the extendible cantilever support arm 14*a* and the bearing cap 129. The unique wiping washer 136 is housed inside the bearing cap 129 as illustrated in Fig. 12. The washer may be of a compressed felt or paper construction. The washer itself should be light in weight. The central bore 138 should be sufficient to accommodate the extendible cantilever support arm 14*a*. The lower portion of the wiping washer 136 is counterweighted with a counterweight 139 which may be made of metal, or the same material of which the washer itself is made. The counterweight 139 serves to hold the washer 136 in wiping contact with the top surface of the shaft 14*a*, thereby insuring a wiping action as the support arm 14*a* extends and retracts through the bearing cap 129.

Figures 13, 14:
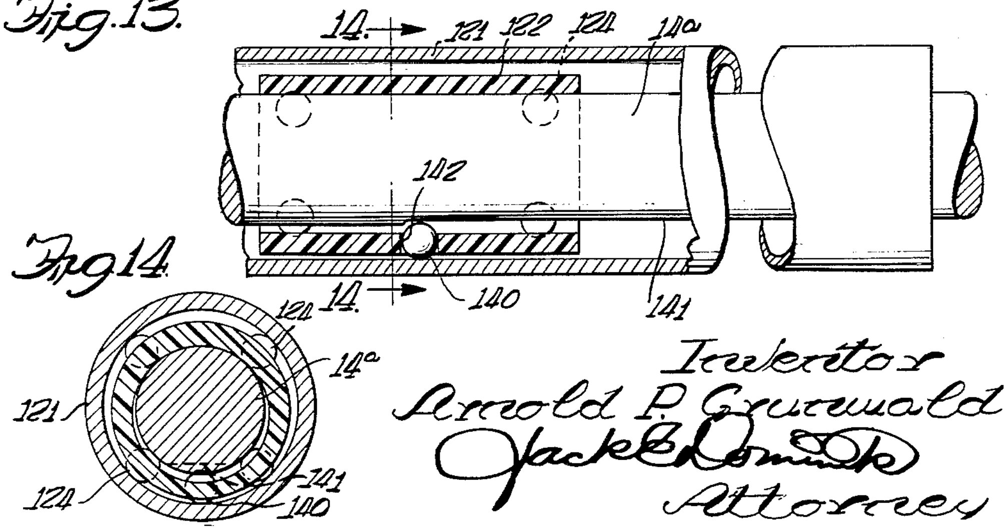
Fig. 13 is an enlarged, partial longitudinal section of the bearing sleeve shown in Fig. 12.
Fig. 14 is a transverse section of the tone arm bearing taken along section line 14—14 of Fig. 13.

In operation, there exists the possibility that the internal wiring 22*a* may become twisted or fouled if the pick-up head 16a is rotated excessively. To prevent this action, the modified pick-up arm is provided with a unique ball lock. The construction of the ball lock is best illustrated in Figs. 13 and 14. There it will be seen that the lock contemplates a single enlarged ball 140 which co-acts with a flat 141 ground on to the lower portion of the cantilever support arm 14a. Anytime the arm is rotated either upwardly or downwardly in excess of 15° to 20° the face of the flat 141 will contact the enlarged ball 140 which rests within the hole 142 in the sliding sleeve 122 and jam the unit against further rotation. The operation of the second alternative construction on the turntable of the phonograph is similar to that of the other constructions described in detail above.

When it is desired to retract the pick-up head out of play, such as would be required with an automatic record changer, the support 15 is either hinged or secured for rearward tilting. Upon tilting to that angle equivalent to the frictional atngle of the bearing, the head will automatically slidingly retract along the same axis as it extended while the record was being played. A suitable stop to present the rotation of the head during the retraction would be required. Such a stop can be fixed to the extendible arm and coact with the tie rod.

Having been retracted, another record may be set in place on the turntable of the record changer and the pick-up head again engaged with the record. When the pick-up arm 10 is used on a typical high fidelity unit where the records are played singly and the needle is manually engaged in the record grooves, the construction of the pick-up head facilitates engaging the needle in the groove without tracking it across the groove ridges. This follows since the arm is extended in one direction by pulling the head into place and then a rotating or twisting motion follows to drop the needle in a vertical plane into engagement with the associated record. With the typical tangential pick-up type arm, it is difficult to coordinate this movement since there is no clearly defined vertical plane in which the needle may rotate.

Conventional pick-up arms also induce a tracking error through the loose joints which necessarily must be located at the far end of the pick-up arm. With the type of pick-up arm described, the bearing support cradles the support arm in such a manner as to effectively eliminate lost motion and greatly reduces distortion. The needle reactive forces are as close to radial as practicable being insured this orientation by the location of the center of mass of the pick-up arm outboard of the needle rather than along a tangent to the groove. By reversing the mounting of the pick-up head and the bearing orientation the unit may be adapted for engaging the needle frontally rather than trailingly, thereby offering the user additional fidelity of reproduction as well as improved wearing characteristics of the needle.

Although a particular embodiment of the invention has been shown and described in full here, there is no intention to thereby limit the invention to the details of such embodiment. On the contrary, the intention is to cover all modifications, alternative embodiments, usages and equivalents of the radial phonograph pick-up arm as fall within the spirit and scope of the invention, specification and appended claims.

I claim as my invention:

1. A radial phonograph pick-up arm comprising, in combination, a single cantilever support arm with a pick-up head secured to one end thereof, a support, a sleeve fixed to the support and proportioned to define an annular space when the support arm is placed within the fixed sleeve, a retaining sleeve within the annular space and an even number of bearing pockets therein, oriented rolling balls within the retaining sleeve pockets and bridging the annular space, a flat on the support arm, a locking ball pocket within the retaining sleeve, and a locking ball within the pocket proportioned to lock the support rod against rotation by engaging the flat.

2. In a radial phonograph pick-up arm having an extendible support arm to the end of which a pick-up head is secured, and which is journaled in a bearing support post, a rotation limit assembly comprising, in combination, a sleeve fixed to the bearing support coaxially surrounding the journaled portion of the support arm and defining an annular space between the sleeve and support arm, a ring within the annular space, a pocket within the ring, a flat defining a face on the support arm, and a ball within the pocket proportion to engage the flat upon a predetermined rotation of the support arm.

3. In a radial phonograph pick-up arm having a single cantilever suport arm journaled in a bearing support post, a dust wiper comprising, in combination, a bearing cap having a central bore complementary but out of contact with the cantilever support arm, the cap being secured to the bearing support to shield the arm, and a counterweighted wiping washer within the cap proportioned at its central opening to receive the support arm and counterweighted at its lower portion to insure a light, sliding, wiping action as the support rod slides in and out through the bearing cap.

4. In a radial phonograph pick-up arm having a single cantilever support arm, journaled in a bearing support post, a dust wiper, comprising, in combination, a central bore complementary but out of contact with the cantilever support arm, the cap being fixed in scaled relation with the bearing, and a counterweighted wiping washer within the cap proportioned at its central opening to receive the support arm and counterweighted at its lower portion to insure a light, sliding wiping action as the support rod slides in and out through the bearing.

5. In a radial phonograph pick-up arm having a single cantilever support arm journaled for longitudinal extension and radial rotation and having a pick-up head at one end thereof and a bearing support, means for tilting the vertical axis of the bearing support to reduce the bearing friction induced during the extension of the cantilever support arm.

References Cited in the file of this patent

UNITED STATES PATENTS

| | | |
|---|---|---|
| 893,292 | Wlost | July 14, 1908 |
| 2,219,230 | Krause | Oct. 22, 1940 |
| 2,413,206 | Worsham | Dec. 24, 1946 |
| 2,774,430 | Blazek | Dec. 18, 1956 |

FOREIGN PATENTS

| | | |
|---|---|---|
| 846,487 | France | Sept. 18, 1939 |
| 387,021 | Germany | Dec. 22, 1922 |